United States Patent [19]

Smith

[11] Patent Number: 4,861,220
[45] Date of Patent: Aug. 29, 1989

[54] LOAD POSITIONING ASSEMBLY AND METHOD

[75] Inventor: Adam J. Smith, Aylestone, England

[73] Assignee: Caterpillar Industrial Inc., Mentor, Ohio

[21] Appl. No.: 235,149

[22] Filed: Aug. 23, 1988

[30] Foreign Application Priority Data

May 27, 1988 [GB] United Kingdom ............. 8812634.7

[51] Int. Cl.[4] ................................................ B60P 1/64
[52] U.S. Cl. ................................... 414/495; 414/589; 414/498; 414/401
[58] Field of Search ............... 414/495, 498, 584, 589, 414/590, 391, 396, 401

[56] References Cited

U.S. PATENT DOCUMENTS

| | | | |
|---|---|---|---|
| 3,119,503 | 1/1964 | Herpich et al. | 414/495 |
| 3,183,777 | 5/1965 | Damm | 414/401 X |
| 3,719,299 | 3/1973 | Oehler | 414/495 |
| 3,722,716 | 3/1973 | Tantlinger | 414/391 |
| 3,857,501 | 12/1974 | Lassig et al. | |
| 3,948,403 | 4/1976 | Johansson | 414/495 |
| 3,995,760 | 12/1976 | Burgdorf et al. | 414/498 |
| 4,226,568 | 10/1980 | Christian | 414/589 |
| 4,456,418 | 6/1984 | Harter et al. | |
| 4,496,274 | 1/1985 | Pipes | |
| 4,538,950 | 9/1985 | Shiomi et al. | |
| 4,741,412 | 5/1985 | Sable | |

FOREIGN PATENT DOCUMENTS

| | | | |
|---|---|---|---|
| 1531809 | 1/1970 | Fed. Rep. of Germany | 414/498 |
| 2502302C3 | 7/1981 | Fed. Rep. of Germany | |
| 3219459A1 | 1/1983 | Fed. Rep. of Germany | |
| 3316050A1 | 11/1984 | Fed. Rep. of Germany | |
| 8602952 | 7/1986 | Fed. Rep. of Germany | |
| 2485497 | 12/1981 | France | |
| 8014121 | 12/1981 | France | |
| 609011 | 9/1960 | Italy | 414/495 |
| WO83/04007 | 11/1983 | PCT Int'l Appl. | 414/495 |

OTHER PUBLICATIONS

PCT Publication WO86/02057, H. Hagen, Published Apr. 10, 1986.
European Patent Application No. 0 166 588 A3, C. F. Whitingham, Published Jan. 2, 1986.

*Primary Examiner*—Robert J. Spar
*Assistant Examiner*—Robert S. Katz
*Attorney, Agent, or Firm*—Alan J. Hickman

[57] ABSTRACT

A load positioning assembly and method for locating and maintaining a load supporting device on a material handling vehicle, includes a load carrying device mounted on a frame and a load carrying portion elevationally movable along an elevationally oriented axis. A pilot member which is freely movably supported on a carrier connected to the load carrying portion is elevationally movable with the load carrying portion between first and second preselected elevationally spaced apart positions relative to the frame. A first engaging device moves the pilot member in directions transverse to the axis in response to movement of the pilot member toward the first elevational position and maintains the pilot member at a first preselected transverse location relative to the axis and the load supporting device at a preselected transverse location at the first elevational position of the load carrying portion. The load positioning assembly is particularly suited for use on an SGV.

19 Claims, 4 Drawing Sheets

LOAD POSITIONING ASSEMBLY AND METHOD

DESCRIPTION

TECHNICAL FIELD

This invention relates to a load positioning assembly and method for a material handling vehicle and more particularly to a load positioning assembly having a pilot member which is arranged to engage a load supporting member supported on the vehicle.

BACKGROUND ART

Material handling vehicles, and particularly automatic guided vehicles (AGV's) of the driverless type are typically utilized for transporting loads between work stations and storage locations. Such vehicles have a load carrying deck which is provided for supporting the load. Frequently, such decks are elevationally movable for positioning the deck at an appropriate height to receive a load or to lift a load located above the deck. AGV's and in particular self guided vehicles (SGV's), vehicles which have free ranging capabilities and do not require wires, stripes or other fixed guide paths, are sensitive to load distribution and require the load to be placed precisely on the vehicle so that the on-board vehicle sensors used for guidance purposes receive accurate readings of the actual position of the vehicle. For example, if the load is offset, the loading of the vehicle wheels will be unequal and this will cause unequal compression of the tires and a slight deviation in the rolling radius of the wheels from the calculated value. This will result in an error in the location of the vehicle calculated from information received from the wheel sensors. As operating time continues the error will increase and eventually the vehicle will be unable to perform load acquisition and deposit activities. Therefore, it is important that the load be positioned on the vehicle accurately.

Frequently, the load carried on the vehicle is retained on the deck by restraining devices such as spaced-apart gates, stops and the like. These restraining devices are provided to keep the load on the deck and from falling off the deck during vehicle operation. The restraining devices normally permit different sizes of loads to be positioned therebetween and this may allow for excessive movement of smaller dimensioned loads on the deck during vehicle operation. Because of this movement, the load may not be able to be positioned close enough to the storage rack, conveyor, machine tool and the like to permit transfer. It is therefore important that the load be accurately retained on the vehicle to overcome this problem.

The load to be transported is often carried on a load supporting device, such as a pallet, rack, table or the like which is greater in width than the width of the vehicle. In such applications, the load supporting device is often not positioned on the vehicle so that the extension of the load past the sides of the vehicle are equal. In this position the center of gravity of the load will be transversely offset from the center of gravity of the vehicle. During vehicle operation the moment of the offset load acting on the vehicle will cause vehicle bounce, vehicle leaning and the like. Thus, the accuracy of vehicle guidance, load positioning, and efficiency of operation will suffer.

Vehicles such as AGV's and SGV's often operate in narrow aisle environments. These vehicles are normally guided for movement down the center of the aisle and in close proximity to the sides of the aisle. Therefore, an offset load on the vehicle which extends past one of the vehicle sides more than necessary will reduce the amount of aisle space available and the tolerance in navigation error that can be accommodated. Thus it is important that the load supporting device be accurately located on the vehicle and restrained from movement in directions transverse to the vehicle.

Fixed conical devices have been provided on vehicles having elevationally movable decks to allow a portion of the vehicle deck to float so that it may be aligned with a conveyor, machine tool and the like and to restrain the vehicle deck portion during vehicle travel by engaging the cones with cups on the deck portion. A separate restraint and positioning device is provided since these conical devices do not position and restrain the load supporting device on the vehicle deck. This adds to the complexity and cost of the vehicle.

In situations where the load supporting device is to be lifted from an underlying supporting surface it would be inappropriate to provide fixed cones on the deck of the vehicle and pilot bores in the load supporting device. During elevation of the deck the cones would first engage the bores and drag the load supporting device along the underlying surface until the load was centered relative to the vehicle. This loading would apply forces to the lifting deck and the vehicle in directions transverse the elevational movement of the deck and cause adverse loading of the deck and of the vehicle. This side loading would result in a reduction in the life of the load carrying deck and the vehicle. In situations where the weight of the load on the load supporting device is substantial, the vehicle, instead of the load, may be moved. This would greatly reduce the accuracy of operation of an AGV or SGV and eventually result in error so great that alignment and the continuance of vehicle operation would be impossible. The present invention is directed to overcoming one or more of the problems as set forth above.

DISCLOSURE OF THE INVENTION

According to the invention there is provided a load positioning assembly for a material handling vehicle having a frame, comprising a load carrying device having: a load carrying portion mounted on the frame and movable in directions along an elevationally oriented axis; a carrier having a support portion connected to and movable with the load carrying portion and having a support portion; a pilot member freely carried on the support portion of the carrier and being elevationally movable with the load carrying portion between first and second preselected elevationally spaced apart positions relative to the frame; and first means for engaging the pilot member, for moving it in directions transverse to the axis in response to movement of the pilot member towards the first elevational position, and for maintaining the pilot member, when in the first elevational position, at a first preselected transverse location relative to the axis.

The invention also includes a method for positioning a load supporting member on a frame of a material handling vehicle, comprising the steps of moving a load carrying portion and a pilot member in an elevational direction toward a first elevational position and engaging the pilot member with a load supporting device. Guiding the pilot member in directions transverse the direction of elevational movement and into a bore in the load supporting member. Engaging the load supporting device and elevating the load supporting device for free movement in directions transverse to the direction of elevational movement of the load carrying device, and engaging the pilot member and urging the pilot member to a first preselected transverse location relative to the direction of elevational movement of the load carrying portion and the load engaging member to a preselected transverse location relative to the frame.

BEST MODE FOR CARRYING OUT THE INVENTION

With Reference to the drawings, a material handling vehicle 10, in the form of a self guided vehicle (SGV), has a load carrying device 12 mounted on the vehicle frame 14. The load carrying device 12 has a load carrying portion 16 in the form of a rectangularly shaped deck 18, first and second guide rod assemblies 20,22, and a linear actuator 24 for moving the load carrying portion 16 along an elevationally oriented axis 26 between first and second spaced apart locations 28,30 relative to the vehicle frame 14. The load carrying portion 16 has first and second anti-friction bearing assemblies 32,34 connected to the deck 18 at locations on the deck 18 adjacent diagonally opposed first and second corner portions 36,38 of the deck 18. The bearing assemblies 32,34 each have a plurality of balls 40 arranged on a ball carrier 42 and are suitable for guiding a load supporting device 44 in directions transverse to the axis 26. The deck 18 is rigidly connected to the first and second guide rod assemblies 20,22 and guided thereby for elevational movement in directions along the axis 26, the deck being maintained perpendicular to the axis 26 by the guide rod assemblies 20,22. The axis 26 extends substantially vertically from the vehicle frame at a location midway between first and second spaced apart sides 46,48 of the vehicle 10 and between first and second end portions 50,52 of the vehicle 10. Ideally the axis should pass through the center of gravity of the vehicle 10 for optimum load distribution reasons.

The load supporting device 44 has a top member 54 and a plurality of parallel spaced apart legs 56 connected to and extending from the top member 54. The legs 56 support the device 44 on an underlying surface 58. The top member 54 supports a load 60 and the legs maintain the load 65 at a preselected distance from the underlying surface 58 so that the load carrying device 12 and the second end portion 52 of the vehicle may be located therebeneath so that the load supporting device 44 can be lifted by the load carrying device 12. The space between the legs 56 is greater than the distance between the first and second vehicle sides 46,48 to allow the vehicle first end portion 52 to be guided therebetween. The space between the legs 56 should not be excessive since this would increase the overall width of the load supporting device and restrict the vehicle to operation to wider aisle applications. Many of the SGV applications utilize narrow aisles to increase storage capacity and therefore the load supporting device should be as narrow as possible.

Figure 1:
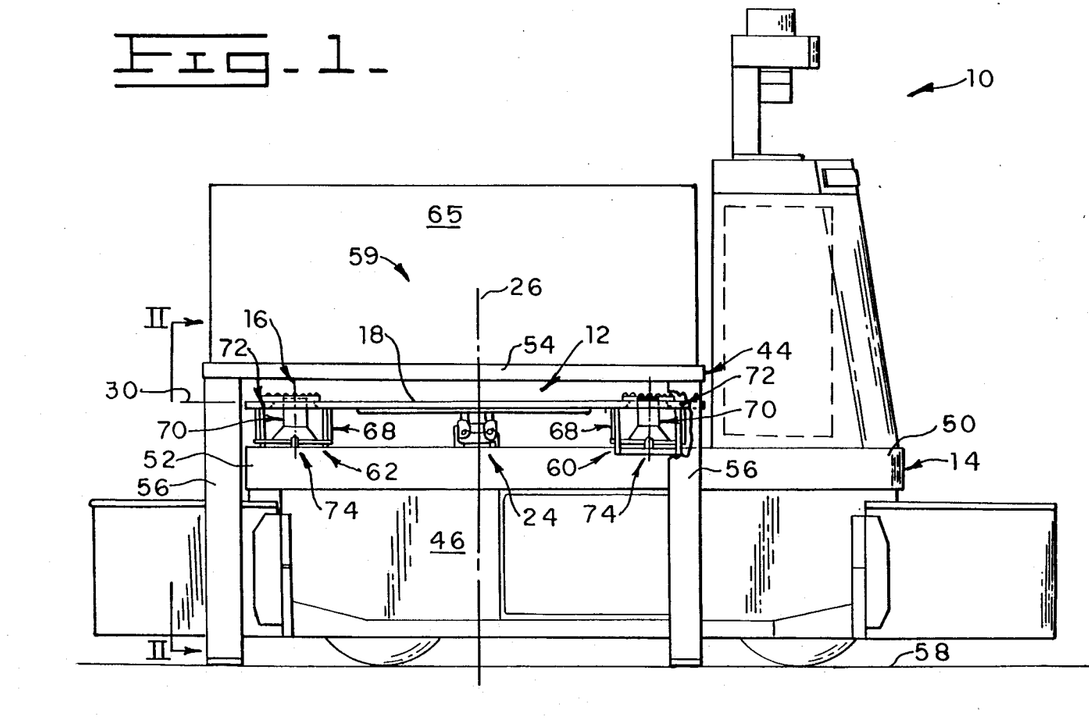
FIG. 1 is a diagrammatic side elevational view of a material handling vehicle.
Figure 2:
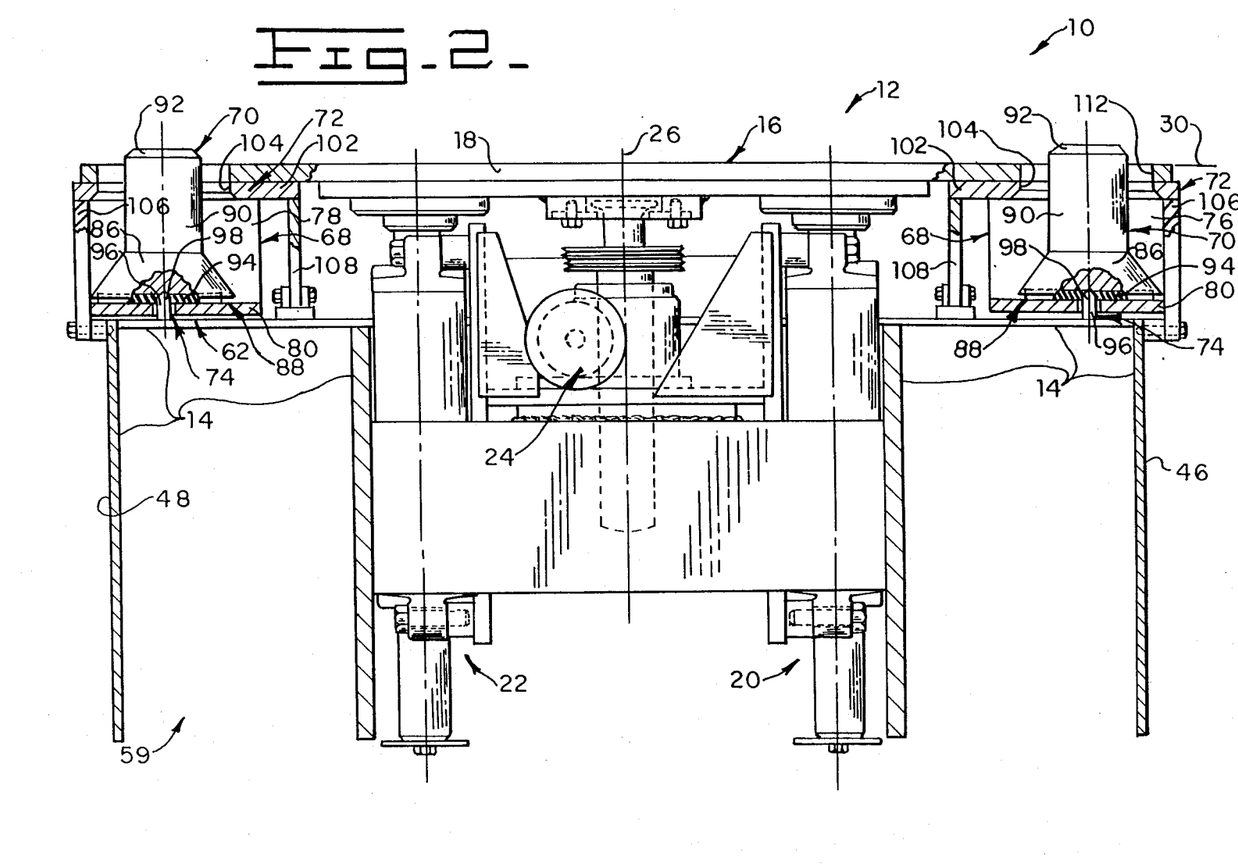
FIG. 2 is a diagrammatic partial broken view taken along lines II—II of FIG. 1 showing a load carrying device, pilot member and first and second engaging means in greater detail.
Figure 3:
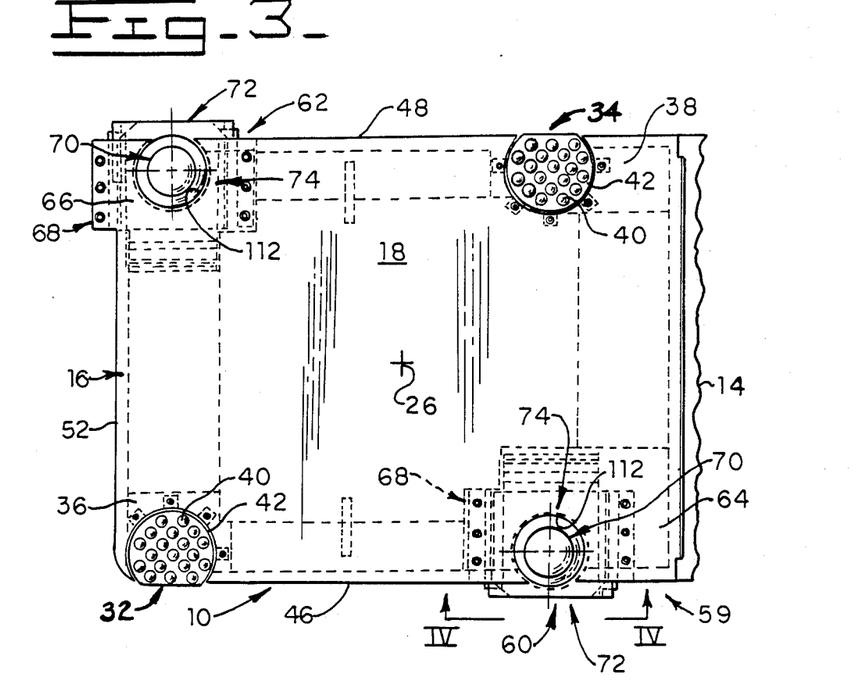
FIG. 3 is a diagrammatic plan view of the material handling vehicle of FIG. 1, showing the load carrying device, pilot member and first and second engaging means in greater detail.
Figure 4:
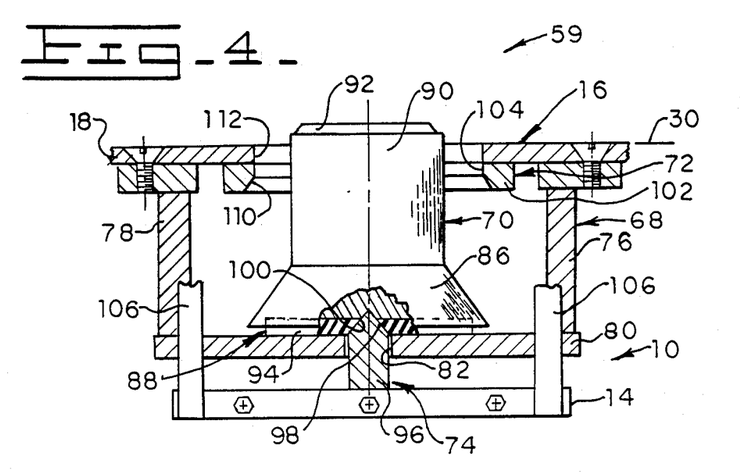
FIG. 4 is a diagrammatic elevational view taken along lines IV—IV of FIG. 3, with parts broken away and showing greater detail.
Figure 5:
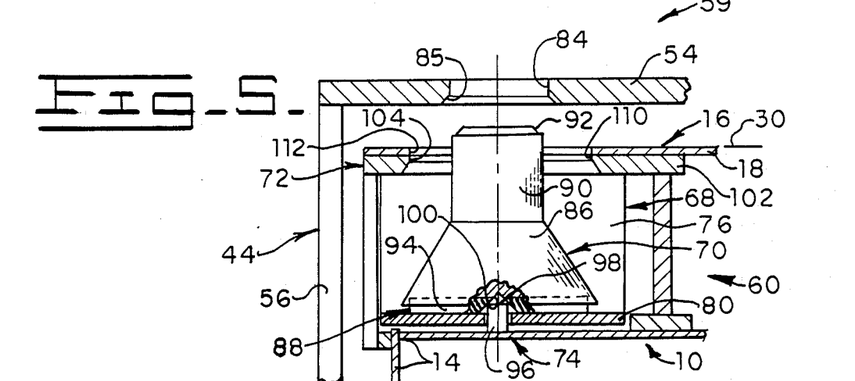
FIG. 5 is a partial diagrammatic elevational view of the material handling vehicle of FIG. 1 showing the load carrying device at a second elevational position.
Figure 6:
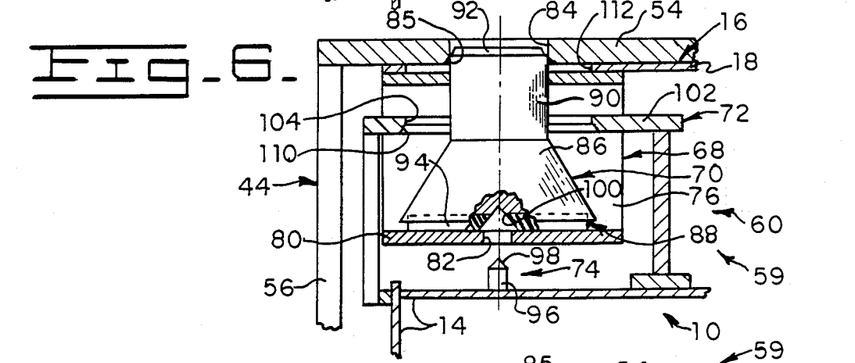
FIG. 6 is a partial diagrammatic elevational view of the material handling vehicle of FIG. 1 showing the load carrying device at an intermediate elevational position between first and second elevational positions.
Figure 7:
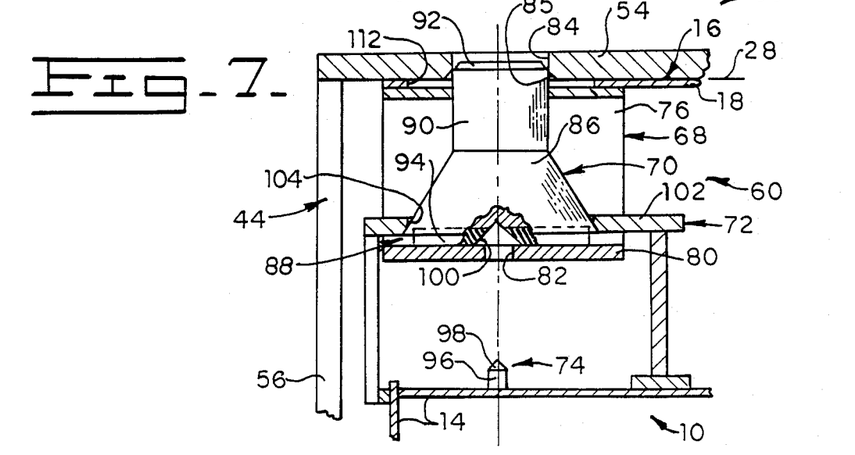
FIG. 7 is a partial diagrammatic elevational view of the material handling vehicle of FIG. 1 showing the load carrying device at the first elevational position.

A load positioning assembly 59 having first and second positioning devices 60,62 is provided to locate the load supporting device 44 on the load carrying device 12 and maintaining the load supporting device 44 at a preselected location on the vehicle 10. As best seen in FIG. 3, the first and second positioning devices 60,62 are located adjacent third and fourth opposed corner portions 64,66, respectively, of the deck 18. The first and second positioning devices 60,62 are constructed and operate in an identical manner. Any discussion relating to one of the first and second positioning devices 60,62 will also relate to the other of the first and second positioning devices 60,62.

As best seen in FIGS. 2 and 4–7, the positioning devices 60,62 each include a carrier 68, a pilot member 70, and first and second engaging means 72,74. The carrier 68 has first and second spaced apart sides 76,78 and a support portion 80. The first and second sides 76,78 are connected to and between the load carrying portion 16 and the support portion 80. The carrier 68 is movable with the load carrying portion 16. The pilot member 70 is freely carried on the support portion 80 of the carrier 68 and movable with the load carrying portion 16 between the first and second elevationally spaced apart positions 28,30 as determined by the length of stroke of the linear actuator 24. The support portion 80 has an aperture 82 disposed therein for receiving the second engaging means 74 at the second elevational position 30 of the load carrying portion 16.

The first engaging means 72 is provided for contacting the pilot member 70 and moving the pilot member 70 in directions transverse to the axis 26 in response to movement of the pilot member toward the first elevational position 28 and for maintaining the pilot member 70 at a first preselected transverse location relative to the axis 26 at the first elevational position of the pilot member 70 and the load supporting device at a preselected transverse location relative to the vehicle frame 14. The first transverse location of the pilot member 70 of the first and second positioning devices 60,62 is determined as a function of the location of bores 84 (FIGS. 5–7, only one shown) in the top member 54 of the load supporting device 44 relative to the dimensions of the top member 54 so that the load supporting device 44 may be positioned and maintained on the vehicle 10 at an optimum preselected transverse location relative to the vehicle frame 14 wherein the load is centered on the deck 18 and the sides of the load supporting device 44 are equally spaced from the closest adjacent sides of the vehicle. This will overcome the problems of load distribution as discussed above. It should be noted that the bores 84 have a conical bore portion 85 which assists in guiding the pilot members 70 into the bore 84 and aids in urging the pilot members 70 transverse to the axis 26 during elevational movement of the pilot member toward the first position 28.

The pilot member 70 has a tapered lower end portion 86, a bearing end 88 and a cylindrical shank portion 90 extending axially from the tapered end portion 86. The shank portion 90 has a chamfered top end portion 92 to assist in positioning the shank end portion 90 in the top member bore 84 and, the bearing end 88 has a planar bearing member 94 attached thereto in any suitable manner, such as by bonding, fasteners, and the like. The planar bearing member 94 is preferably a non-metallic plastics material which is resistant to abrasion, wear and the like. The pilot member 70, and specifically the planar bearing member 94, is freely and loosely supported on the carrier support portion 80 and slidably movable on the support portion 80 in directions transverse to the axis 26 in response to an external force being applied to the pilot member 70. The support portion 80 is parallel to the deck 18 so that the vertical distance between the pilot member 70 and the deck 18 is maintained constant during transverse movement of the pilot member 70 relative to the axis 26.

The second engaging means 74 is provided for engaging the pilot member 70 and moving the pilot member 70 in directions transverse to the axis 26 in response to movement of the pilot member 70 and load carrying portion 16 towards the second elevational position 30 and for maintaining the pilot member 70 at a second preselected transverse location relative to the axis 26 at the second elevational position of the load carrying member 16 and the pilot member 70. The second engaging means 74 includes a spigot 96 having a conically shaped upper end portion 98. The spigot 96 is parallel to the axis 26 and mounted on the frame 14 to establish the second preselected transverse location of the pilot member 70.

The pilot member 70 has an axially disposed tapered recess 100 disposed in the bearing end 88. The tapered recess 100 extends through the planar bearing member 94 and into the tapered end portion 86 of the pilot member 70. The recess 100 engages the conically shaped end portion 98 at the second elevational position of the pilot member 70 and location of the pilot member 70.

The pilot member 70 has an axially disposed tapered recess 100 disposed in the bearing end 88. The tapered recess 100 extends through the planar bearing member 94 and into the tapered end portion 86 of the pilot member 70. The recess 100 engages the conically shaped end portion 98 at the second elevational position of the pilot member 70 and seatingly maintains the pilot member 70 at the second transverse position established by the preselected location of the spigot 96 on the frame 14. The aperture 82 in the carrier 68 and the tapered recess 100 in the pilot member 70 are axially aligned when the spigot 96 extends through the aperture 82 and is in seated engagement with the tapered recess 100.

The first engaging means 72 includes a guide member 102 having an aperture 104 there through and first and second spaced apart side portions 106,108 connected to and between the guide member 102 and the frame 14. The first and second spaced apart side portions 106,108 are connected to the frame 14 in any suitable manner, such as by threaded fasteners, and secures the guide member 102 to the frame to maintain the guide member 102 at a location adjacent the carrier 68. The pilot member 70 is disposed in the guide aperture 104, seatingly engaged at the pilot member tapered end portion 86 with the guide member aperture 104 at the first elevational position 28 of the pilot member 70, and disposed in and free from engagement with the guide member aperture 104 at the second elevational position 30 of the pilot member 70. The pilot member 70 is disposed between the first and second side portions 76,78 of the carrier 68 and the first and second side portions 106,108 of the first engaging means 72 and retained on the carrier 68 by the first and second side portions 76,106,78,108. The aperture 104 preferably has a conically tapered portion 110 which assists in leading the pilot member 70 into the aperture 104 and urging the pilot member 70 on the carrier 68 transverse to the axis 26.

The deck 18 of the load carrying device 12 has bores 112 disposed there through which permits the shank portion 90 of each of the pilot members 70 to extend there through and engage the bores 84 in the top member 54. The shank portions 90 extend through the deck bores 112 to a preselected distance above the deck 18 and remain above the deck 18 in all elevational positions of the load carrying portion 16. It is to be noted that the deck bores 112 are substantially larger in diameter than the diameter of the shank portions 90 so as not to interfere with transverse motion of the pilot members 70 and positioning of the load supporting device 44 relative to the vehicle frame first and second sides 46,48.

As alluded to in the previous discussion the first and second transverse locations of the pilot member 70 are determined by the locations of the first and second engaging means 72,74 on the vehicle frame 14. As can be seen from the drawings, the pilot member 70 is elevationally axially aligned when seated in the guide member aperture 104 or seated on the spigot 96. Therefore, the axes of the guide member aperture 104 and the conically tapered portion 104 and the and spigot 96 are preferably axially aligned, and the tapered recess 100, tapered end portion 86 and the cylindrical shank portion of the pilot member 70 are concentric. This will ensure that these parts will be able to mate as desired and reduces the potential for mismatch and undesirable contact and loading.

The method for positioning the load supporting member 44 on the frame 14 of a material handling vehicle 10, involves moving the load carrying portion 16 of the load carrying device 12 and the pilot member 70 in an elevational direction towards a first elevational position 28 and engaging the pilot member 70 with the load supporting device 44. The pilot member 70 is guided in directions transverse to the direction of elevational movement of the load carrying portion 16 and into a bore 84 in the load supporting member 44. The load supporting device 44 is thus engaged and is elevated for free movement on the first and second bearing assemblies 32,34 in directions transverse to the direction of elevational movement of the load carrying portion 16. The pilot member 70 is engaged and urges the pilot member 70 to a first preselected transverse location relative to the direction of elevational movement of the load carrying portion 16 and the load engaging member 44 to a preselected transverse location relative to the frame 14.

The method also includes the step of moving the load carrying portion 16 from a second elevated position 30 toward a first elevated position 28 and freeing the pilot member 70 from being maintained at a second transverse location relative to the direction of elevational movement of the load carrying portion 16 on the frame 14.

The method further includes the step of forcing the pilot member 70 into seated engagement with a first engaging means 72 at the first elevational position 28 of the pilot member 70 and maintaining the load engaging member 44 at the preselected transverse location and the pilot member 70 at the first preselected transverse location.

Industrial Applicability

In operation, and with reference to the drawings, in order to lift a load 65 supported on a load supporting device 44 the second end portion 52 of the SGV 10 locates beneath the top member 54 and between the legs 56 of the load supporting device 44. SGV's have demonstrated the ability to operate relatively accurately in several actual applications. However, the degree of accuracy in positioning the SGV 10 will vary. Therefore, this invention solves the problem by providing the first and second positioning devices 60,62 which allow for a preselected maximum amount of misalignment of the load supporting device 44 relative to the vehicle 10. As the SGV 10 approaches the approximate location beneath the top member 54 it will stop according to preprogrammed instructions. The onboard controller (not shown) will then actuate the linear actuator 24 which will raise the deck 18 from the second elevational position 30 toward the first elevational position. In the second elevational position 30 the pilot members 70 are at the second transverse location at which the pilot members 70 are seated on their respective second engaging means 74 and vertically aligned with the first engaging means 72 located directly above. This prepositioning of the pilot members 70 ensures proper fit-up and eliminates the potential for binding, interference and the like.

As the deck 18 moves toward the first position, the carrier 68 which is rigidly affixed to the deck 18 elevationally moves the pilot members 70 from seated engagement between the shafts conically shaped shaft end portions 98 and the tapered bores 100 and releases the pilot members 70 to slide freely on the carrier support portion 80 since no external restraints are thereafter applied to the pilot members 70. The pilot members 70 remain free to float relative to the vehicle frame 14 when the deck 18 is located between the first and second elevational positions 28,30. As the deck 18 approaches the top member 54 the chamfered end 92 of the pilot members 70 will engage the top member 54 at locations adjacent the top member bores 84. Due to a slight axial misalignment between the bores 84 and the pilot members 70, the top member conical bore portion 85 and chamfered end portion 92 will engage and urge the shank portion 90 of the pilot members 70 to slide transversely on the carrier support portion 80. This transverse sliding motion will occur as the deck 18 moves toward the first position 28 and until the shank portions 90 are disposed in the top member bores 84.

After disposition of the pilot members 70 in the bores 84 occurs, the first and second bearing assemblies 32,34 will engage the top member 54 and elevate the load supporting device 44 from being supported on the underlying surface 58 by the legs 56. It is important to recognize that the supporting device is lifted vertically without the need to side it on the underlying surface 58 for positioning purposes. Thus, damage to the underlying surface 58 caused by dragging the legs 56 on the floor, damage to the SGV 10 caused by side loading forces and inadvertent sliding and movement of the vehicle are eliminated. At this location in the sequence of positioning of the load supporting device 44 the top member 54 and the piloting members 70 are engaged with each other but free to float transversely relative to the axis 26 as permitted by the bearing assemblies 32,34.

As the deck 18 continues to lift the load supporting device 44 toward the first elevational position 28 the pilot members 70 will begin engaging the first engaging means 72 and start urging the pilot members 70 toward their second location which will result in subsequent urging of the load supporting device 44 toward the preselected transverse location relative to the vehicle sides 48,50 and axis 26. The exact elevational location between the first and second elevational positions 28,30, at which contact between the pilot members 70 and the first engaging means 72 occurs, and the magnitude of transverse movement that the pilot members 70 and the load supporting device 44 must make will vary from loading operation to loading operation because they are a function of the degree of error in positioning of the SGV 10 relative to the load supporting device 44. This urging of the pilot members 70 by the first engaging means 72 will occur until the tapered end portions 86 of the pilot members 70 are fully seated in the conically tapered portions 110 of the aperture 104 of the guide members 102. When the seating occurs the pilot members 70 will be at their first transverse location, the deck 18 will be at the first elevational position, and the load supporting device 44 will be at the preselected transverse location relative to the SGV.

The pilot members 70, and first engaging means 72, when fully seated, will retain the load supporting device 44 from movement in directions transverse to the axis 26 and prevent shifting of the load supporting device 44 on the SGV 10 during travel of the SGV between loading and unloading locations.

To unload a load supporting device 44 from the SGV at a deposit location simply requires a lowering of the deck 18 until the legs 56 of the load supporting device 44 are engaged with the underlying surface 58 and the deck 18 is at the second elevational position. It is to be noted that the pilot members 70 are automatically positioned at the second location and retained thereby by the second engaging means 74 when the deck 18 is at the second elevational position 30.

Thus it can be seen that the load positioning assembly 59 provides a simple and unique solution to the aforementioned problems by freeing the pilot members 70 for positioning prior to lifting of the load supporting device 44, lifting the load supporting device 44 prior to positioning of the load supporting device relative to the vehicle 10, and positioning and maintaining the load supporting device at the preselected transverse location on the frame 14.

Other aspects objects and advantages of the present invention can be obtained from a study of the drawings, the disclosure and the appended claims.

I claim:

1. A load positioning assembly for a material handling vehicle having a frame, comprising:
   a load carrying device having a load carrying portion mounted on the frame and movable in directions along an elevationally oriented axis;

a carrier having a support portion and being connected to and movable with the load carrying portion;

a pilot member freely carried on the support portion of the carrier and being elevationally movable with the load carrying portion between first and second preselected elevationally spaced apart positions relative to the frame; and first means for engaging the pilot member, moving said pilot member in directions transverse to the axis in response to movement of the pilot member towards the first elevational position, and for maintaining the pilot member at a first preselected transverse location relative to the axis in response to being at the first elevational position.

2. A load positioning assembly, as set forth in claim 1, including a second means for engaging the pilot member, moving the pilot member in directions transverse to the axis in response to movement of the pilot member toward the second elevational position, and maintaining the pilot member, at a second preselected transverse location relative to the axis in response to being at the second elevational position.

3. A load positioning assembly, as set forth in claim 2, wherein the pilot member has a tapered end portion and a bearing end portion, said bearing end portion being slidably engaged with the carrier support portion and said pilot member being engaged with the first engaging means at the first elevational position.

4. A load positioning assembly, as set forth in claim 3, wherein said pilot member has a tapered recess, said pilot member tapered recess being engaged by the second engaging means at the second elevational position.

5. A load positioning assembly, as set forth in claim 3, including a planar bearing member affixed to the bearing end portion of the pilot member, said planar bearing member having a tapered recess and said tapered recess being adapted to receive the second engaging means.

6. A load positioning assembly, as set forth in claim 3, wherein the load carrying device includes a deck extending in a direction transverse to the axis and a bore disposed through the deck, said pilot member having a cylindrical shank portion extending from the tapered end portion and a chamfered end portion, the cylindrical shank portion being disposed in the deck bore.

7. A load positioning assembly, as set forth in claim 4, wherein the carrier has first and second spaced apart side portions connected to and between the load carrying portion and the support portion, said support portion having an aperture disposed therethrough for receiving the second engaging means at the second elevational position of the load carrying portion, said pilot member being disposed between the first and second side portions, and said tapered bore of the pilot member and the aperture of the carrier being axially aligned.

8. A load positioning assembly, as set forth in claim 1, wherein the first engaging means includes a guide member having an aperture and being connected to the frame at a location adjacent the carrier, said pilot member being disposed in and engageable with the guide member aperture at the first elevational position and disposed in and free from engagement with the guide member aperture at the second elevational position.

9. A load positioning assembly, as set forth in claim 8, wherein the first engaging means includes first and second spaced apart sides connected to and between the guide member and the frame, said pilot member being disposed between the first and second guide member sides.

10. A load positioning assembly, as set forth in claim 4, wherein the second engaging means includes a spigot having a conically shaped end portion and being mounted on the frame at a preselected location on the frame, said spigot being oriented in a direction substantially parallel to the elevational axis and the conically shaped end portion being disposed in the pilot member tapered bore and engaged with the pilot member at the second elevational position.

11. A load positioning assembly, as set forth in claim 1, including a load supporting device having a top member and a bore disposed at a preselected location in the top member, said load carrying device having a deck and a plurality of bearing assemblies mounted on the deck, said top member being supported on the bearing assemblies and the pilot member being disposed in the bore of the load supporting top member at the first elevational position, said pilot member maintaining the load supporting device at a preselected transverse location relative to the vehicle frame at the first elevational position.

12. A load positioning assembly, as set forth in claim 11, including a second means for engaging the pilot member and moving the pilot member in directions transverse to the axis in response to movement of the pilot member towards the second elevational position, said second means maintaining the pilot member at a second preselected transverse location relative to the axis at the second elevational position, said pilot member being free from disposition in the load supporting top member bore and the load supporting device being free from restraint relative to the vehicle frame at the second elevational position.

13. A load positioning assembly, as set forth in claim 11, wherein the load supporting device is free to move on the bearing assemblies in directions transverse the axis, said pilot member being free to move on the carrier in directions transverse the axis in response to the pilot member being located between the first and second elevational positions.

14. A load positioning assembly, as set forth in claim 11, wherein the load supporting member includes a plurality of legs connected to the top member, said legs being engaged with and supporting the load supporting member on an underlying surface at the second position of the load carrying portion and being free from supporting engagement with the underlying surface at the first position of the load carrying portion.

15. A load positioning assembly, as set forth in claim 11, wherein the pilot member has a tapered end portion, a bearing end portion, and a shank portion extending from the tapered end portion, said bearing end portion being slidably engaged with the carrier support portion, said tapered end portion being engaged with the first engaging means at the first elevational position, and said shank portion being engaged in the top member bore at the first elevational position.

16. A load positioning assembly, as set forth in claim 11, wherein the top member bore has a conical bore portion, said conical bore portion urging the pilot member transverse to the axis and guiding the pilot member into the top member bore in response to movement of the pilot member toward the first position.

17. A load positioning assembly, as set forth in claim 16, wherein the first engaging means includes a guide member, said guide member engaging the pilot member and moving the pilot member to the first transverse location and the load supporting device to the preselected transverse location relative to the frame in response to elevational movement of the pilot member towards the first elevational position.

18. A method for positioning a load supporting device on a frame of a material handling vehicle including a load carrying portion and a pilot member, comprising the steps of:

moving the load carrying portion and the pilot member in an elevational direction toward a first elevational position and engaging the pilot member with the load supporting device;

guiding the pilot member in directions transverse the direction of elevational movement and into a bore in the load supporting device;

engaging the load supporting device and elevating the load supporting device for free movement in directions transverse to the direction of elevational movement of the load carrying portion; and engaging the pilot member and urging the pilot member to a first preselected transverse location relative to the direction of elevational movement of the load carrying portion and the load supporting device to a preselected transverse location relative to the frame.

19. A method, as set forth in claim 18, further including an initial step of moving the load carrying portion from a second elevated position toward a first elevated position and freeing the pilot member from being maintained at a second transverse location relative to the direction of elevational movement of the load carrying portion on the frame.

* * * * *